United States Patent [19]
Lampert et al.

[11] Patent Number: 5,442,478
[45] Date of Patent: Aug. 15, 1995

[54] ELECTROCHROMIC DEVICE USING MERCAPTANS AND ORGANOTHIOLATE COMPOUNDS

[75] Inventors: Carl M. Lampert, El Sobrante; Yan-ping Ma, Berkeley; Marca M. Doeff, Hayward; Steven Visco, Berkeley, all of Calif.

[73] Assignee: The Regents, University of California, Berkeley, Calif.

[21] Appl. No.: 872,830

[22] Filed: Apr. 23, 1992

Related U.S. Application Data

[63] Continuation-in-part of Ser. No. 606,063, Oct. 30, 1990, Pat. No. 5,142,406.

[51] Int. Cl.⁶ .............................................. G02F 1/153
[52] U.S. Cl. ..................... 359/273; 359/274; 359/275
[58] Field of Search ............... 359/265, 269, 270, 272, 359/273, 274, 275

[56] References Cited

U.S. PATENT DOCUMENTS

| | | | |
|---|---|---|---|
| 3,451,741 | 6/1969 | Manos | 359/275 |
| 3,652,149 | 3/1972 | Rogers | 359/275 |
| 3,774,988 | 11/1973 | Rogers | 359/275 |
| 4,212,518 | 7/1980 | Imataki et al. | 359/272 |
| 4,326,777 | 4/1982 | Kohara et al. | 359/272 |
| 4,902,108 | 2/1990 | Byker | 359/265 |
| 5,288,433 | 2/1994 | Stevens | 359/270 |

Primary Examiner—Georgia Y. Epps
Assistant Examiner—Thomas Robbins
Attorney, Agent, or Firm—Paul R. Martin

[57] ABSTRACT

An electrochromic cell is disclosed which comprises an electrochromic layer and a composite ion counter electrode for transporting ions. The counter electrode further comprises a polymer electrolyte material and an organosulfur material in which, in its discharged state, the organosulfur material is further comprised of a mercaptan or an organothiolate. In one preferred embodiment, both the electrochromic electrode and the counter electrode are transparent either to visible light or to the entire electromagnetic spectrum in both charged and discharged states. An electrochromic device is disclosed which comprises one or more electrochromic electrodes encased in glass or plastic plates on the inner surface of each of which is formed a transparent electrically conductive film. Electrical contacts, which are in electrical contact with the conductive films, facilitate external electrical connection.

43 Claims, 2 Drawing Sheets

ELECTROCHROMIC DEVICE USING MERCAPTANS AND ORGANOTHIOLATE COMPOUNDS

BACKGROUND OF THE INVENTION

The invention described herein arose in the course of, or under, Contract No. DE-AC03-76SF00098 between the U.S. Department of Energy and the University of California.

This is a continuation-in-part of co-pending U.S. patent application Ser. No. 606,063 which was filed on Oct. 30, 1990 now U.S. Pat. No. 5,142,406, issued Aug. 25, 1992, and is incorporated herein by reference.

1. Field of the Invention.

This invention relates to electrochromic films. More particularly, this invention refers to electrodes comprising reversible mercaptan or organothiolate films, and electrochromic films which are used to form an electrochromic cell. This invention also relates to the formation of improved electrochromic devices from electrochromic cells.

2. Description of the Prior Art.

Electrochromism refers to a reversible color change which occurs in certain materials in the presence of an applied electric field or current. Devices that rely on electrochromic switching mechanisms, such as electrochromic films, are well known in the prior art. Typical uses for such devices include: windows for watches, calculators and computer display screens; eye protection such as eyeglasses, sunglasses and goggles of various types; switchable mirrors and sun visors; automobile, architectural, aircraft, marine, and spacecraft windows; large area information displays such as those used in airports, railway stations, motorways, and for stock exchange boards; voltage indicators; computer memory elements; and auto headlamp covers. Electrochromic films can also be used on opaque substrates including metallic or metal-like surfaces, and in combination with solar cells. The use of switchable windows, for instance, can provide greater flexibility for the control of daytime lighting. As a result, a reduction in power requirements for environmental heating and cooling can be realized. Electrochromic optical shutter devices can also assure privacy and provide glare control.

Not long ago, a basic electrochromic switching device was described in "Electrochromic Materials and Devices for Energy Efficient Windows", by Carl M. Lampert, in *Solar Energy Materials*, 11 (1984), pp. 1-27, North-Holland, Amsterdam. The article surveyed a number of compounds that are capable of functioning as electrochromic materials, and discussed their applicability for use in the construction of optical shutters for windows. More recently, in a chapter entitled "Chemical and Optical Studies of Electrochromic Hydrated Nickel Oxide Films and Devices", in *Large Area Chromogenics: Materials and Devices for Transmittance Control*, C. M. Lampert and C. G. Granqvist, Optical Engineering Press, Bellingham, Wash. (1989), the use of hydrated nickel oxide in the construction of electrochromic devices was discussed.

More recently, the use of polymerizable organosulfur compounds for electrode materials in rechargeable electrochromic cells was discovered. U.S. Pat. No. 4,833,048 to De Jonghe, et al., describes and claims such a cell wherein polymerizable organosulfur material is used as the cathode. The organosulfur material described therein has the general formula, in its charged state, of $(R(S)y)n$ where $y = 1-6$, $n = 2-20$, and R is one or more of the same or different aliphatic or aromatic organic moieties having 1-20 carbon atoms. When the organosulfur electrode material is charged, one sulfur atom(s) of the $R-(S)_y{}^-$ monomer forms a sulfur-sulfur bond (S—S) with a sulfur atom of another $R-(S)_y{}^-$ monomer. This results, in the simplest case, in the formation of an R—S—S—R dimer moiety. Cells utilizing both liquid and solid versions, respectively, of such organosulfur electrodes are further described and claimed in U.S. Pat. No. 4,917,974 and application for U.S. application Ser. No. 07/421,091, filed Oct. 13, 1989.

In co-pending application for patent U.S. Ser. No. 07/606,063, now U.S. Pat. No. 5,142,40 , to Lampert and Visco, the construction of an electrochemical device using solid state reversible polymerization electrodes was first discussed. Solid polymerization electrodes have several advantages over many of the earlier electrochromic cell materials discussed above. One advantage is that they can exist in solid form at room temperature, and do not corrode other elements of electrochromic cells or degrade with time. Despite these advances, however, there are still a number of problems that persist.

One disadvantage of many electrochromic devices is that two different electrochromic electrodes must be fabricated that have complimentary or matching properties. Where transparent electrochromic devices are desired, for example, the counter electrode of the cell must be either a colorless or a matching electrode, i.e., one that will also become transparent at the same charge/discharge level as the first electrode. It is a nontrivial task to identify and generate two such seemingly disparate materials. It would greatly facilitate the construction of electrochromic devices, therefore, if matching electrodes were not required. This would result in the need for fewer fabrication steps, and ultimately reduce the cost of producing such electrochromic devices.

Another disadvantage of current solid-state electrochromic devices is occasionally observed where the device is incapable of uniformly returning to the transparency and color quality of that observed for the device in its original, uncharged state. This problem, mainly associated with large-area applications, may be referred to as "incomplete bleaching." An example of incomplete bleaching is seen where a material remains partially colorized in one region, while the surrounding area reverts to a completely colorless appearance upon discharge of the electrochromic cell. This inability to "bleach" the colored region may be due to such phenomena as the formation of competing or "parasitic" reactions that deplete the ions required to bleach/color the device. Such parasitic reactions are particularly problematic in applications where both the electrochromic and ion storage layers change color upon application of a potential.

Most of the electrochromic devices that are now known require a voltage drop across three layers of an electrochromic cell in order to effectively switch the device. In general, the three layers consist of an ion-conducting electrochromic material, a separator layer, and a counter electrode. The migration of ions across these layers is necessary for the observed color changes. For the most part, prior art electrochromic devices for information displays have involved relatively smallscale applications. This is partially due to the fact that it has been difficult to reliably generate electrochromic devices with greater surface area. The larger the area of the device, the harder it becomes to uniformly distribute a potential drop throughout the device. A commonly encountered problem with current large area electrochromic devices is that when the device is discharged, the potential required to completely bleach Certain regions cannot be achieved in some areas because the potential is already at a maximum at others.

It is therefore an object of the current invention to provide an improved electrochromic device for transporting ions that eliminates the need for two electrochromic electrodes with complimentary or matching properties.

It is a further object of the present invention is to provide an improved electrochromic device that will uniformly cycle between colored and uncolored or "bleached" states without loss of color uniformity in either state.

It is another object of the present invention to provide an improved electrochromic device in which balancing the capacity of an ion storage layer and an electrochromic layer is not necessary due to the fact that the ion storage layer does not change physical appearance upon application of a potential.

These and other objects of the invention will become apparent to those skilled in the art from the following description and accompanying drawings.

SUMMARY OF THE INVENTION

The electrochromic device of the current invention comprises an electrochromic cell and electrical conductors. In one embodiment of the invention, the electrochromic cell comprises an electrochromic reservoir further comprising an electrochromic material and a redox material that serves both as an electrolyte and an ion storage medium. The electrochromic material can be alternately electro-colored or de-colored ("bleached") by the dual passage of ions and electrons. It is an electron flow through the conductive path that provides the driving force for the coloration and bleaching of the electrochromic cell.

In an alternate embodiment of the current invention, the electrochromic cell comprises an electrochromic electrode further comprising an electrochromic material, and a composite counter electrode further comprising a redox material. In yet a third embodiment of the current invention, a separator layer is used in conjunction with one or more electrochromic electrodes, or with an electrochromic reservoir and one or more electrochromic electrodes.

In one embodiment of the invention, the redox material is a dimerizable sulfur species contained in a polymer electrolyte. In the preferred embodiment of the invention, the redox material comprises a mercaptan or an organothiolate salt in a polymer electrolyte.

Upon charging the electrochromic device, the sulfur-containing species dimerizes to form disulfide compounds. This causes migration of cations and electrons produced by said dimerization, which in turn results in coloring of the electrochromic cell. Upon discharge of the electrochromic device, scission of the disulfide bonds occurs to regenerate the original sulfur-containing compound, thus resulting in decolorization or bleaching of the electrochromic cell.

Further information to enable the practice of the device and method of the current invention by those skilled in the art will be apparent through the following discussion and description of the figures which follow.

DEFINITIONS

Figure 1:
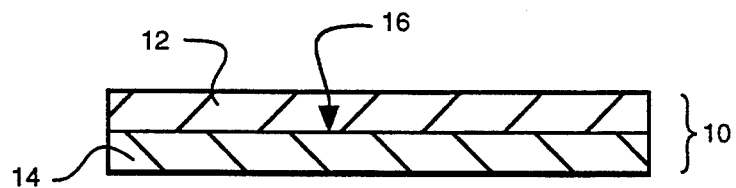
FIG. 1 illustrates an electrochromic cell of one embodiment of the current invention in its simplest form.

In the present specification and claims, reference will be made to phrases and terms of art which are expressly defined for use herein as follows:

The term "bleached" as used herein describes an electrochromic cell that is in a discharged state. Bleached is therefore synonymous with decolored or uncolored. An organosulfur material is described as existing in a bleached state when it exists predominately in a monomeric form.

The term "broad band" is used with respect to any of the materials used in forming the electrochromic device of the current invention, including: the electrochromic material; the polymerizable organosulfur material; the separator, or any other materials used in the device through which such radiation must pass for proper operation of the device; and refers to the solar transmission band of from about 300 nanometers (nm) to about 2500 nm.

The term "charged" as used herein is used to characterize an electrochromic cell in which the electroactive or organosulfur material exists in a dimeric form, and further wherein the electrochromic cell is colored.

The term "colored" is used with respect to an electrochromic cell that is in a charged state. An organosulfur material is described as existing in a charged state when it exists predominately in a dimeric form.

The term "discharged" as used herein describes an electrochromic cell in which the electroactive or organosulfur material exists in a monomeric form, and further wherein the electrochromic cell is decolored or uncolored.

The term "electrochromic material" is used to refer to a material in which a reversible color change occurs by the application of an electric field or current. More particularly, an electrochromic material may be defined as a material having a charge capacity of about 10 to about 200 millicoulombs/cm$^2$ wherein application of a potential of from about 1 to about 10 volts—typically from about 1.5 to about 2.5 volts—results in a transmission change ranging from a minimum change of about 20% up to a theoretical maximum of about 100% change in a particular electromagnetic radiation band. For example, a transmission change from a maximum of about 80% transmission down to a minimum of about 5% transmission (or vice versa), upon application of a potential of from about 1 to about 2 volts, would represent a maximum of about 75% change in transmission.

The term "electrochromism" as used herein refers to a reversible color change which occurs in certain materials upon the application of an electric field or current.

The term "Group IA ion" as used herein refers to a cation, or positively charged ion, selected from the IA group of elements which consist of hydrogen, lithium, sodium, potassium, rubidium and cesium.

The term "mercaptan" is used to refer to a sulfur-containing organic compound of the general formula RSH, in which R is an organic moiety. A mercaptan is also the general name for an organothiolate or a thiol of the general formula RSM, in which case M=hydrogen (H). See also the definitions of "organothiolate" and "thiol" below.

The term "narrow band" is used with respect to any of the materials used in forming the electrochromic device of the current invention, including: the electrochromic material; the polymerizable organosulfur material; the separator, or any other materials used in the device through which such radiation must pass for proper operation of the device; and refers to the visible transmission band of from about 390 nm to about 760 nm.

The term "parasitic" is used herein to characterize reactions or other phenomena that have the effect of depleting the supply of ions responsible for the observed bleaching or coloring of an electrochromic cell or device.

The term "polyethylene oxide" (PEO) as used herein refers to PEO in any form, whether amorphous or not. Polyethylene oxide thus includes oxymethylene-linked polyethylene oxide or oxymethylene linked poly(oxyethylene), including the class of polymers having the general formula $(CH_2CH_2O)_n(X)_m$ where X can be any of a number of linking agents, such as oxymethylene ($CH_2O$). (Nicholas, C. V., et al., *Brit. Polym. J.* 20(1988) 289-292), and references cited therein.)

The term "organothiolate" or "thior" is used to refer to a sulfur-containing organic compound of the general formula RSM, in which R is an organic moiety, and M is a Group IA element having an ionic charge of +1. In the case where M is hydrogen (H), the thiol is commonly referred to as a "mercaptan." See also the definition of "mercaptan" above.

The term "semitransparent" as used herein refers to a material which will transmit approximately 20% to 70% of the electromagnetic radiation in a particular wavelength band. The wavelength band may be either a broad band or a narrow band, or even a specific band or wavelength of light, e.g. red light or blue light.

The term "substrate" as used herein refers to a support member which may be glass or plastic or other such material as is appropriate for providing support for the layers of an electrochromic cell or an electrochromic device.

The term "transparent" is used to refer to a material which will transmit at least about 70% of the electromagnetic radiation in a particular wavelength band. The wavelength band may be either a broad band or a narrow band, or even a specific band or wavelength of light, e.g. red light or blue light. All of the organosulfur compounds of the current invention are transparent to electromagnetic radiation of at least a narrow visible band and, preferably, are transparent to a broad band of light.

DETAILED DESCRIPTION OF THE INVENTION

Figure 2:
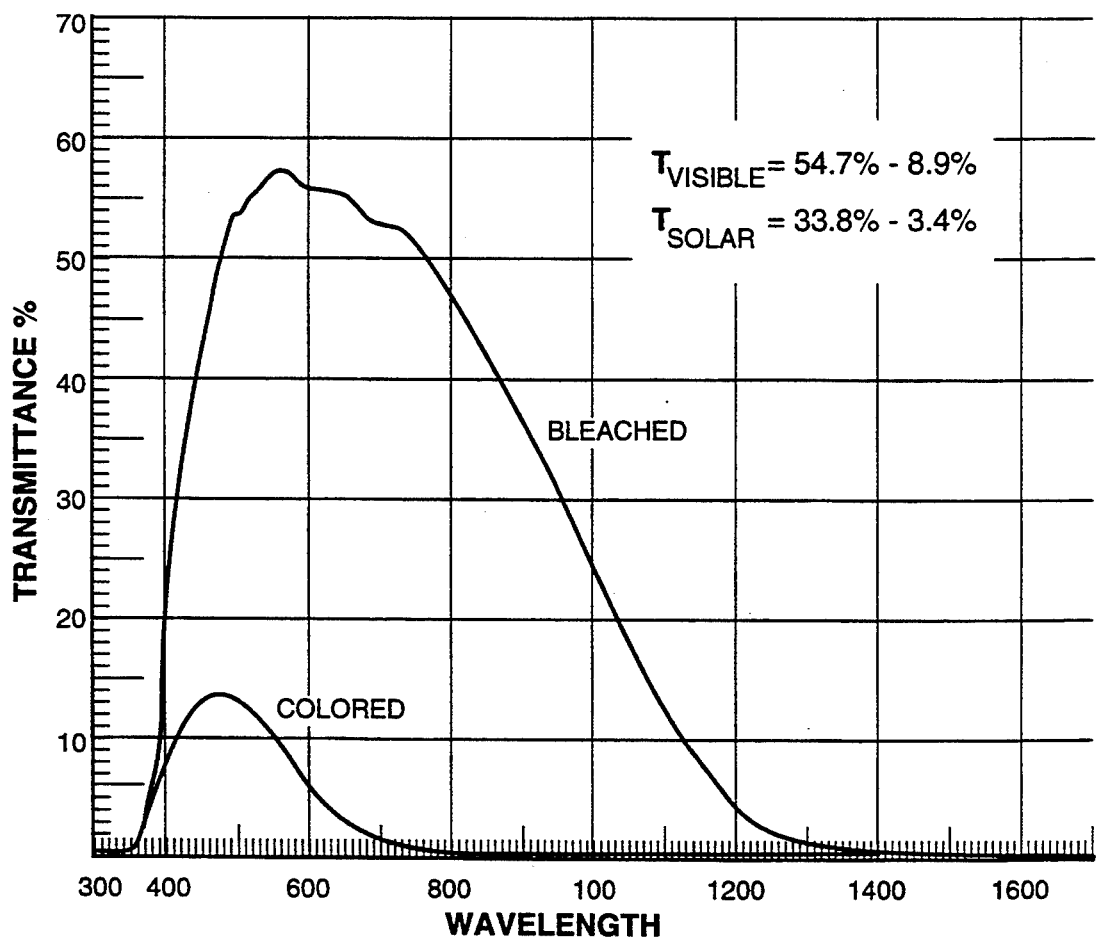
FIG. 2 shows a graph that contains optical switching data for a cell with a structure as shown in FIG. 1.

An electrochromic cell according to the current invention is shown in its simplest form in FIG. 1, and optical switching data for such a device is shown in FIG. 2. FIG. 1 is a vertical cross-section of electrochromic cell 10 showing electrochromic film or layer 12, which comprises one electrode of the structure, and composite ion storage layer 14, which comprises a counter electrode of the structure. Electrochromic layer 12 and composite ion storage layer 14 are coparallel layers, and are in mutual contact at common interface 16. In a preferred embodiment of the current invention, ion storage layer 14 is transparent, both in its charged and uncharged states, to visible light (narrow band) or to the entire electromagnetic spectrum (broad band).

Materials which may comprise electrochromic layer 12 include transition metal hydroxides and metal oxides such as ($WO_3$), molybdenum oxide ($MoO_3$), niobium oxide ($Nb_2O_5$), vanadium oxide ($V_2O_5$), titanium oxide ($TiO_2$ or $Ti_2O_5$), copper oxide ($Cu_2O$ or uncolored CuO), bismuth oxide ($Bi_2O_3$), lead oxide (PbO or $PbO_2$), chromium oxide ($Cr_2O_3$), rhodium oxide (RhO, $Rh(OH)_x$, $Rh_2O_3$, or $RhO_2$), cobalt oxide (COO), manganese oxide (MnO or $Mn(OH)_2$), ruthenium hydroxide ($Ru(OH)_x$), nickel oxide (NiO or $Ni(OH)_2$), osmium hydroxide ($Os(OH)_x$), and iridium oxide (IrO, $IrO_2$, or $Ir(OH)_3$).

Electrochromic layer 12 may also comprise mixtures of any of the above, especially tungsten oxide-vanadium oxide, tungsten oxide-titanium oxide, molybdenum oxide-vanadium oxide, molybdenum oxide-tungsten oxide, nickel oxide-manganese oxide, nickel oxide-cobalt oxide, iridium oxide-tin oxide ($SnO2$), and iridium oxide-indium oxide ($In_2O_3$). Other compounds which may be used as electrochromic layer 12 include: heteropolyacids such as phospho-tungstic acid ($H_3PO_4(WO_3)\cdot xH_2O$); redox compounds such as ferric ferrocyanide ($Fe_4[Fe(CN)_6]_3)\cdot xH_2O$, lithium ferric ferrocyanide ($Li_{x-}Fe_{4-x}[Fe(CN)_6]_3$) or Prussian blue; and metal oxide cermets, such as gold tungstate (Au-WO3) and platinum tungstate (Pt-WO3).

Electrochromic layer 12 may also comprise organic electrochromic materials such: as viologens (halides of quaternary bases derived from 4,4'-dipyridinium (($C_5H_4N)_2$), e.g., diheptylviolgen-dibromide (($C_7H_{15})_2(NC_5H_4)_2Br_2$), (bis-4'-ethylpyridine-4'-yl)pyridium)-perchlorate; benzyl viologen; polyviologen dibromide mixtures such as 1,1'-dibenzyl-4,4'-bipyridinium difluorborate, and 5,10-dihydro-5, 10-dimethylphenazine; methylviologen compounds; pyridine ($C_5H_5N$); ortho-toluidine ($C_{14}H_{18}N_2$), 4,4'-diamino-3,3'-dimethylbiphenyl; anthraquinones such as 2-tertiary butylanthraquinone ($C_{14}H_7O_2C(CH_3)_3$), phenothiazines such as methylene blue ($C_{16}H_{18}ClN_3S$); tetra thiafulvalene ($C_6H_4S_4$); polymers such as pyrazoline ($C_3H_6N_2$); polythiophene (($C_4H_4S)_x$); polyaniline (($C_6H_5NH_2)_x$); polytriphenylamine ($[C_6H_5)_3N]_x$; phthalocyanine lanthanides such as lutetium diphthalocyanine (($C_{32}H_{16}N_8)_2Lu$); and tris(5,5'-dicarbo(3-acrylatoprop-1-oxy)-2,2'-bipyridine) ruthenium(II).

The thickness of electrochromic layer 12, which may be either in a solid or liquid state, should be sufficient, at a minimum, to provide a continuous film, i.e., usually at least about 100 Angstroms ($10^{-8}$ meters). This thickness may be at least partially controlled by the method used in forming the electrochromic electrode. The thickness of the electrochromic electrode will be further governed by the desired degree of light transmission as well as the desired amount of change in light transmission as the electrochromic material passes from either a charged state to a discharged state or vice versa. A maximum thickness of about 1 micron ($10^{-6}$ meters) for solid state materials should not be exceeded in order to avoid compromising the performance of the device due to longer ionic paths.

The electrochromic electrode may be formed by any one of a number of different and. well-known methods. Examples of such methods include: sputtering or reactive sputtering of electrochromic materials onto a substrate; chemical deposition from a solution; electrochemical deposition; evaporation; spinning; spraying; chemical vapor deposition (CVD), which includes plasma-enhanced CVD; vacuum evaporation which includes electron beam evaporation, or using a reactive gas such as $O_2$; and use of a sol-gel method. The electrochromic electrode may be made solely of electrochromic material, i.e., in pure form, or an electrochromic material may be used in combination with a transparent carrier, such as polyethylene oxide.

The counter electrode, composite ion storage layer 14, may comprise a polymeric electrolyte material and an organothiol (or mercaptan) material, the former serving as an electrolyte, and the latter serving as an ion storage medium. The organosulfur material further comprises a compound having the general formula, in its uncharged or monomeric state, of RSH or RSM, where M=$Li^+$, $Na^+$, $K^+$, $Cs^+$, $Rb^+$, etc.. In its charged or dimer state, the organosulfur material comprises a compound having the formula of $(R(S)_y)_2$ wherein y is 1 to 6, and preferably 2. R is one or more of the same or different aliphatic or aromatic organic moieties having 1 to 100 carbon atoms, and may include one or more oxygen, sulfur, or nitrogen heteroatoms when R comprises one or more aromatic rings, or one or more oxygen, sulfur, nitrogen or fluorine atoms associated with the chain when R comprises an aliphatic chain, wherein the aliphatic chain may be linear, branched, saturated or unsaturated, and wherein either the aliphatic chain or the aromatic ring may have substituted groups thereon.

In its simplest form, the organosulfur material is a mercaptan or organothiolate compound, the; basic or backbone formula of which is RSM. In its dimerized state, when the device is colored, the sulfur atom (or atoms) forms an S—S bond with a sulfur atom of another RSM group forming the dimer RS—SR. Upon bleaching of the device, the S—S bond is broken, and each RS— group forms a salt with a metal ion or proton. The result is a monomer species containing sodium or lithium, for example, to form RSNa or RSLi, respectively, or a mercaptan, if the $RS^-$ *group recombines with a proton*.

In certain instances, the organosulfur material may have the formula RS—SR' in its dimerized state. In other words, both the R and R' may comprise the same or different organic moieties as described above. It will, of course, be understood that the foregoing description showing formation of a dimer with RS—SR can also indicate the mixed dimer form RS—SR', or formation of dimers containing sulfur atoms (such as RSS—SSSR') and is principally for illustrative purposes. Such organosulfur compounds and others which are useful in the practice of the invention are further described in the aforesaid U.S. Pat. Nos. 4,833,048 and 4,917,974 to De Jonghe, et al., and application for patent U.S. Ser. No. 07/421,091 to Visco, et al.

The organosulfur material may be formed into an electrode consisting solely of an organosulfur material, or it may be combined in a transparent and ionically conductive matrix. Generally, any suitable transparent material that is stable in the presence of the electrochromic electrode and conducts ions may be used in storage layer 14. In the preferred embodiment of the invention, composite ion storage layer 14 comprises an organosulfur material and a polymeric electrolyte such as polyethylene oxide. The organosulfur material or the polymeric electrolyte may be used as a liquid or a solid, but preferably both are used in a solid state.

Examples of polymeric electrolyte materials which may be used in the practice of the invention include: polyethylene oxide (PEO); polyethylene glycol and polyethylene glycols linked with groups suck as oxymethylene or oxypropylene such as oxymethylene-linked polyethylene oxide; polypropylene oxide (PPO): polyvinyl alcohol; polypropylene glycol; and poly[bis(-(methoxyethoxy)ethoxy)] phosphazene (MEEP). Of the foregoing materials, amorphous polyethylene oxide is a particularly preferred compound because although it is a solid and has no vapor pressure, it has a sticky or gooey characteristic which results in good adherence and contact with the electrochromic electrode.

While the composite ion storage electrode in the preferred embodiment is described as a transparent electrode, it should be noted that for certain applications, e.g. displays, this counter electrode need not be transparent. Nontransparent materials, such as powdered carbon, may be added to the above list of polymeric electrolyte materials as desired for certain applications. Similarly, the addition of other transparent or nontransparent additives that render the electrochromic electrode nontransparent is also anticipated. The use of such nontransparent counter electrodes should be apparent: to one skilled in the relevant art, and are deemed to be within the scope of the invention.

Dispersed through the composite ion storage layer there may also be dispersed an electrolyte in the form of a salt, an acid or a base. The cation of the salt may comprise an alkali metal such as lithium, sodium, potassium, rubidium, and cesium, while the anion may comprise any element or compound such as triflate ($CF_3SO_3^-$), borate ($B_4O_7^{2-}$), carbonate ($CO_3^{2-}$) silanate ($RSiO^-$), silicate ($SIO_{2.5-1}^{2-}$), phosphate ($HPO_4^{2-}$) chlorate ($ClO_4^-$), chlorine ($Cl^-$), or hydroxide ($OH^-$), which will not interfere with operation of the device. It should be noted that, in some instances, oxides may also be used as the anion if they are sufficiently soluble, and such oxide usage is intended to be included in the use of the terms "anion" and "salt". Examples of ion storage layers include 2-mercapto-1-methyl imidazole in polyethylene oxide, or a lithium salt of dimercapto-thiadiazole in polyethylene oxide and lithium triflate.

Thus, the electrolyte may include at least one Group IA element selected from the class consisting of hydrogen, lithium, sodium, potassium, rubidium, and cesium. When the electrolyte is in the form of an acid or a base, it may comprise, for example, $H_3PO_4$, $(C_2H_5)_4NOH$, or $HN(CF_3SO_2)_2$. The amount of electrolyte used in the counter electrode may range from about one molecule of electrolyte per 20 units of monomer (PEO) up to about one molecule of electrolyte per 6 units of monomer.

In operation of the device, the electrochromic film is switched from transparent to colored, and reversed, by ion transfer. A reversible reaction for tungsten oxide with a generalized mercaptan is shown as follows:

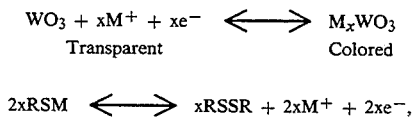

$$2xRSM \longleftrightarrow xRSSR + 2xM^+ + 2xe^-,$$

Where: $M^+ = H^+$, $Li^+$, etc., and
R = organic.

The counter electrode layer may be formed, for example, when using polyethylene oxide (PEO), by mixing about 3 parts by weight of PEO powder with about 97 parts by weight of a solvent such as acetonitrile and then adding sufficient electrolyte to achieve the aforementioned ratio of electrolyte molecules to units of monomer. Mercaptan or organothiolate is then added so that the final solid electrode contains about 10-30 weight percent of the mercaptan or organothiolate electroactive material. The thickness of the composite ion storage layer counter electrode may range from about 0.01 millimeters ($10^{-5}$ meters) to about 0.1 millimeters ($10^{-4}$ meters).

Overall, the minimum concentration of organosulfur material in the electrode is governed by the amount of ions needed to cause the electrochromic material to color. This minimum amount of organosulfur material (i.e., minimum amount of charge capacity) may be calculated based upon the amount of electrochromic material used in the device, or determined empirically based on observation of the change in light transmission of the electrochromic material. It should be noted, however, that the use of an mount of organosulfur electrode material in excess of this minimum amount is not considered to be harmful, although it may be economically wasteful.

The minimum thickness of counter electrode 14 must be sufficient to permit formation of a continuous film, usually at least about 100 Angstroms. The maximum thickness of the counter electrode is not critical and is normally governed by the attenuation in transparency or transmission which occurs if the electrode is formed of excessive thickness. For most applications, a maximum thickness of about 0. 1 millimeters ($10^{-4}$ meters) should not be exceeded in order to avoid degrading the performance of the device.

Figure 3:
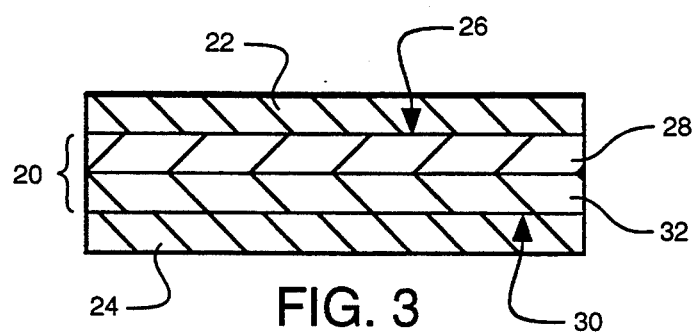
FIG. 3 illustrates an electrochromic device containing a two-layer electrochromic cell according to an alternate embodiment of the current invention.

Turning now to FIG. 3, a more complete embodiment or version of the electrochromic structure or device of the present invention is illustrated. FIG. 3 shows electrochromic cell 20 placed between first transparent conductor layer 22 and second transparent conductor layer 24. Conductor layer 22 is located on the outer surface of electrochromic layer 28 with which it is in mutual contact along common interface 26, and conductor layer 24 is located on the outer surface of composite ion storage layer 32 with which it is in mutual contact along common interface 30.

Transparent conductor layers 22 and 24 may comprise from about 0.01 to about 0.5 microns ($10^{-8}$ to $5 \times 10^{-7}$ meters) of the same or different conductive material such as: tin oxide ($SnO_2$) doped with antimony or fluorine ($SnO_2$:F, Sb); indium oxide ($In_2O_3$ (5-15% Sn); zinc oxide (ZnO); zinc oxide and indium (ZnO:In); zinc oxide and aluminum (ZnO:Al); cadmium stannate ($Cd_2SnO_4$); cadmium stannate ($CdSnO_3$); cadmium oxide (CdO); copper sulfide ($Cu_2S$); titanium nitride (TIN); or titanium oxynitride ($TiO_xNi_{1-x}$). Metals such as copper, silver, gold, aluminum, nickel, stainless steel, chromium, titanium, rhodium, and brass may also be used as transparent conductive layers 26 and 28 in thicknesses ranging from about 30 to about 1000 Angstroms (about $3 \times 10^{-9}$ to about $10^{-7}$ meters). Conductor layers 22 and 24 provide electrical contact to the electrochromic electrode and the counter electrode, providing a sheet resistance typically of about 10 to about 15 ohms/square.

As is well known to those skilled in the art, transparent conductor layers can be produced by any one of several techniques. Examples of such techniques include, but are not limited to, vacuum deposition, sputtering, evaporation, solution dipping, chemical vapor deposition, electrochemical deposition, sol-gel techniques, and spraying. Furthermore, the conductor layers may be in the form of a continuous film, discontinuous film, dispersed conductor, or grid conductor.

Figure 4:
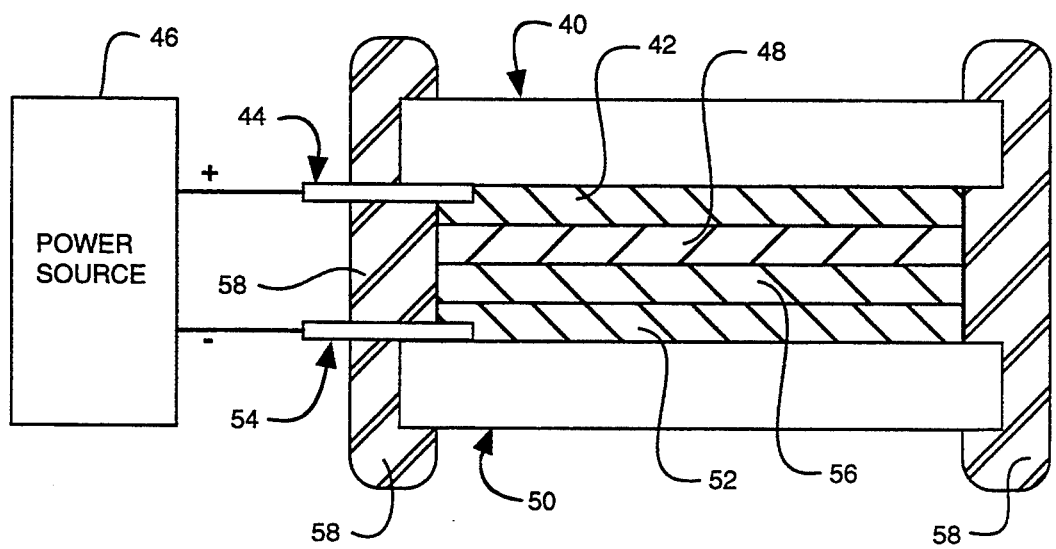
FIG. 4 illustrates a more complete electrochromic device containing an electrochromic cell according to another embodiment of the current invention.

In FIG. 4, the construction of an electrochromic device is illustrated, utilizing the structure or cell shown in FIG. 3. First glass or plastic substrate 40 is coated with a layer of transparent electrically conductive material to form first transparent electrical conductor 42 thereon. Electrically conductive connector 44 is then attached to conductor 42 to provide an external connection for the device to potential source 46. A layer of electrochromic material is then applied over transparent conductor 42 to form electrochromic electrode 48 thereon. In another embodiment of the invention, the electrochromic material may be dispersed throughout the ion storage medium.

Continuing with respect to FIG. 4, second glass or plastic substrate 50 is coated with the same or different transparent electrically conductive material to form second transparent conductor 52, and second electrically conductive connector 54 is then attached to conductor 52 to provide external electrical connection to the other terminal of potential source 46. A layer of composite or composite ion counter electrode material is then formed over conductor 52 to form composite ion storage layer 56. The two portions of the structure may then be placed together to form the device shown in FIG. 4.

It should be noted, in this regard, that the various layers need not be formed in the manner just described. For example, after forming transparent conductor 42 on glass or plastic substrate 40, and forming electrochromic electrode 48 over conductor 42, counter electrode 56 can be formed over electrochromic electrode 48. Second transparent conductor 52 can then be formed as a layer over electrode 56, followed by application of second glass or plastic substrate 50 over conductor 52 to complete formation of the composite structure of the device.

The edges of the layers and/or the interfaces at the edges of the device may be sealed by using sealing material 58. Sealing material 58 can comprise any insulating material which is sufficiently non-porous to prevent entrance of foreign materials, including moisture, at such interfaces between the various layers of the composite structure. For example, an epoxy, a silicone, or a butyl rubber sealant compound, or a combination of the same can be utilized for this purpose. In addition, if desired, a rigid frame such as a wood or metal frame can be fitted around the edges of the device to impart more mechanical strength to the device. If a metal frame is used, care is needed to prevent any electrical shorting of the layers. In such instances, insulating sealing material 58 will provide sufficient electrical isolation and insulation of such a metal frame from the active layers of the device. It should be noted that the preference for using solid state materials in all the layers of the device does not require sealing the interface edges between the layers. Rather, sealing can be used to exclude foreign materials from penetrating into the structure, which would otherwise interfere with the ]performance or shorten the lifetime of the device.

Figure 5:
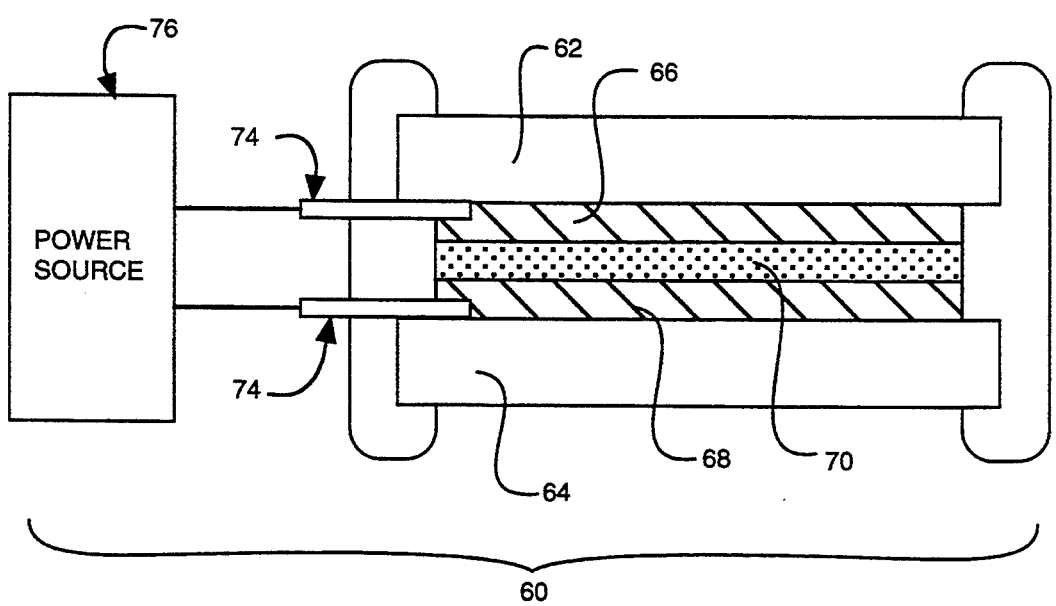
FIG. 5 illustrates an electrochromic device containing a one-layer electrochromic cell according to yet another embodiment of the current invention.

An alternate embodiment of the current invention is shown in FIG. 5. Electrochromic device 60 represents a minimum structure according to the current invention. Device 60 contains first and second glass or plastic substrates 62 and 64 in contact with first and second electrical conductors 66 and 68, respectively. The active electrochromic component of the device is shown at ion storage/dispersed electrochromic layer or electrochromic reservoir 70. Electrochromic reservoir 70 may be formed by dispersing an electrochromic material into the ion storage layer formed as described above. Electrically conductive connectors 72 and 74, power source 76, and sealing material 78 then comprise additional elements of electrochromic device 60.

For certain applications not illustrated here, the electrochromic electrode may be separated from the composite ion storage layer. In such instances, a separator layer may be employed. Such a separator layer is claimed and described in co-pending application U.S. Ser. No. 606,063.

In another embodiment of the invention, also not shown, the electrochromic device may comprise one electrochromic electrode further comprising a composite ion storage/dispersed electrochromic region, and a second electrochromic electrode. Such a device may or may not feature the separation layer described above. Each of the above embodiments are for purposes of illustration only, and further combinations of layers, which will become apparent to those skilled in the art, are understood to fall within the scope of the claimed invention.

With reference again to FIG. 4, the actual operation of the depicted device will be described in greater detail. Electrical connector 44 is connected to one terminal, either negative or positive, of potential source 46. The terminal to which conductor 44 is attached depends upon the type of electrochromic material used at electrode 48. Similarly, electrical connector 54 will be attached to a second terminal of potential source 46 in order to change the transmission characteristics of the electrochromic material forming electrode 48 when a potential is applied. For example, when electrochromic electrode 48 is comprised of $WO_3$, connecting contact 54 to the negative terminal of potential source 46 and connecting contact 54 to the positive terminal of potential source 46 will cause the electrochromic material in electrode 48 to darken upon the application of a potential, i.e., lower the transmission of light through electrode 48.

When this occurs, i.e. upon the application of a potential, it should be noted that counter electrode 56 remains transparent to light. This comprises one of the many advantages of the structure of the current invention over the prior art. As mentioned earlier, one advantage of the current invention is that there is no need to try to match the transmission change characteristics of two different materials as is required with currently known electrochromic devices.

Glass or plastic substrates 40 and 50 will normally comprise transparent materials, with plastic comprising the preferred material of greater flexibility is desired. Such substrates need not both be transparent if the type of device being constructed is one wherein transparency through the entire device is not needed or desired. One such example might be a display device. For such applications, other substrate materials, such as metal substrates, for example, may also be utilized.

It should be further noted that where each of the above layers or components of the electrochromic cell have been described as discrete or separate components or layers, single layers may be formed which are capable of more than one function. The use of such composite layers should be deemed to fall within the scope of the invention, For example, either the electrochromic electrode or the composite ion counter electrode can comprise the transparent conductor material. Similarly, either the electrochromic electrode or the composite ion counter electrode can also comprise an ionic separator layer. It is also possible, for instance, to construct the device of the invention with a second electrochromic material in order to achieve special effects.

The following examples will serve to further illustrate the invention.

EXAMPLE I

Onto a glass plate coated with a 4000 Angstrom thick transparent layer of tin oxide ($SnO_2$) was applied a 3000 Angstrom layer of tungstate ($WO_3$) electrochromic material. The tungstate was electrochemically deposited from a saturated tungsten peroxide solution made by dissolving tungsten metal in 10 ml of $H_2O_2$, which was then diluted to 200 ml total volume with water.

A 0.01 mm thick transparent organosulfur electrode was cast directly over the above electrochromic layer from a mixture of 1 gram of amorphous PEO and 1.5 grams of 2-mercapto-1-methylimidazole dissolved in 10 ml of water. A second tin oxide coated glass plate, such as previously described, was then placed over the organosulfur electrode.

The first tin oxide layer, in mutual contact with the electrochromic electrode, was then connected to the negative terminal of a variable DC potential source, and the second tin oxide layer, in mutual contact with the organosulfur electrode, was connected to the positive terminal. The voltage was then gradually raised until it reached a potential difference, between the electrodes, of about 1.3 volts, at which point a color change from transparent to deep blue was visually observed. Upon removing the connections to the power source, the device gradually bleached. Alternately, the device could be bleached more rapidly by reversing the potential (0.4 volts). Similar results were obtained by forming a tungsten oxide film ($WO_3$) over the conductive layer by reactive sputtering, and by electrochemically depositing molybdenum oxide-tungsten oxide ($MoO_3$-$WO_3$) films.

EXAMPLE II

A device similar to that in Example I was constructed, with the addition of a separator layer between the electrochromic electrode and the ion storage layer. The separator layer was cast directly over the electrochromic layer from a solution of 1 gram of amorphous PEO dissolved in water. This was allowed to dry, and the ion storage layer was then cast over it. Similar procedure to those described in Example I above were then followed.

From the forgoing discussion and examples, one skilled in the art can recognize that the current invention provides an improved electrochromic structure. The use of a composite ion counter electrode and an electrochromic electrode, for example, permits construction of an inexpensive device. Further, the electrochromic electrode and the composite ion counter electrode may exist as discrete and/or separated layers, or may be combined into a singular complex matrix. According to the current device, materials may be used which may be in the solid state, and are chemically compatible with one another. Transport elements which can be used include hydrogen, lithium, sodium and other ionic elements. Furthermore, the use of a composite ion counter electrode in both the charged and discharged states, which may or may not be transparent, makes matching the characteristics of prior art positive and negative electrochromic electrodes unnecessary. The current invention also affords an opportunity to adjust the charge storage capacity of the counter electrode to meet the requirements of the particular electrochromic electrode used.

The foregoing disclosures and descriptions of the invention are illustrative and explanatory of the invention, and various changes in the size, shape, materials and components, as well as in the details of the illustrated construction, placement method, and configuration may be made without departing from the spirit of the invention, all of which are contemplated as falling within the scope of the specification and appended claims. Without further elaboration, it is believed that one of ordinary skill in the art can, using the preceding description, utilize the present invention to its fullest extent.

REFERENCES

The following references have been cited in the present specification, and are expressly incorporated by reference herein.

1. Lampert, C. M., *Solar Energy Materials*, "Electrochromic Materials and Devices for Energy Efficient Windows", 11(1984)1.
2. Lampert, C. M. and Granqvist, C. G., eds., *Large-Area Chromogenics: Optical Switching Device for Transmittance Control*, SPIE-Optical Engineering Press, Bellingham, Wash. (1990).
3. Nicholas, C. V., Wilson, D. J., Booth, C., and Giles, J. R. M., *Brit. Polym. J.*, 20 (1988) 289–292.
4. U.S. Pat. No. 4,833,048 to L. C. De Jonghe, S. J. Visco, C. C. Mailhe, and M. B. Armand, issued May 23, 1989, for "Metal-Sulfur Type Cell Having Improved Positive Electrode."
5. U.S. Pat. No. 4,917,974 to L. C. De Jonghe, S. J. Visco, M. Liu, C. C. Mailhe, issued Apr. 17, 1990, for "Lithium/Organosulfur Redox Cell Having Protective Solid Electrolyte Barrier Formed on Anode and Method of Making Same".
6. U.S. Ser. No. 07/421,091 to S. J. Visco, M. Liu and L. C. De Jonghe, filed Oct. 13, 1989, for "Cell for Making Secondary Batteries."
7. U.S. Ser. No. 07/606,063 to C. M. Lampert and S. J. Visco, filed Oct. 30, 1990, for "Electrochromic Optical Switching Device."

What is claimed is:

1. An electrochromatic cell comprising:
   a) a layer, having first and second surfaces, of solid redox ion storage medium having a solid electrochromatic material dispersed therein and being transparent to electromagnetic radiation of a narrow bandwidth,
   b) a first layer of transparent electrical conductor in electrical contact with the first surface of the solid redox ion storage medium, and
   c) a second layer of transparent electrical conductor in electrical contact with the second surface of the solid redox ion storage medium.

2. The electrochromic cell of claim 1 wherein said transparent electrical conductors are in electrical communication with electrical contact members to permit charge and discharge of said layer by a potential source.

3. The electrochromic cell of claim 1 wherein said redox material further comprises an organosulfur material and an electrolyte material.

4. The electrochromic cell of claim 3 wherein said electrolyte material further comprises a polymer electrolyte.

5. The electrochromic cell of claim 4 wherein said polymer electrolyte further comprises a material selected from the group consisting of polyethylene oxide, oxymethylene-linked polyethylene oxide, amorphous polyethylene oxide, linked polyethylene glycols, polypropylene oxide, polyvinyl alcohol, polyethylene glycol, polypropylene glycol, and poly[bis((methoxyethoxy)ethoxy)] phosphazene.

6. The electrochromic cell of claim 4 wherein said polymer electrolyte comprises polyethylene oxide.

7. The electrochromic device of claim 3 wherein said electrolyte material further comprises an electrolyte material in the form of a salt, an acid, or a base.

8. The electrochromic device of claim 3 wherein said electrolyte material further comprises a Group IA ion selected from the group consisting of hydrogen, lithium, sodium, potassium, rubidium and cesium.

9. The electrochromic cell of claim 2 wherein said organosulfur material further comprises a mercaptan or an organothiolate.

10. The electrochromic cell of claim 3 wherein said organosulfur material further comprises a compound having the general formula, in its dimeric state, of $(R(S)_y)_2$ wherein y is 1 to 6, and R is one or more of the same or different aliphatic or aromatic organic moieties having 1 to 100 carbon atoms which may include one or more oxygen, sulfur, or nitrogen heteroatoms when R comprises one or more aromatic rings, or one or more oxygen, sulfur, nitrogen or fluorine atoms associated with the chain when R comprises an aliphatic chain, wherein the aliphatie Chain may be linear, branched, saturated or unsaturated, and wherein either the aliphatie chain or the aromatic ring may have substituted groups thereon.

11. The electrochromic cell of claim 10 wherein said organosulfur material comprising said compound having the general formula, in the charged state, of $(R(S)_y)_2$ has a value of y of from 2 to 4.

12. The electrochromic cell of claim 3 wherein said organosulfur material is further characterized by a sulfur-sulfur bond when said device is in a charged state which, upon discharge of said electrochromic cell, is broken to form a mercaptan or an organothiolate with a Group IA ion in said cell, further wherein said Group IA ion is selected from the group consisting of hydrogen, lithium, sodium, potassium, rubidium, and cesium.

13. The electrochromic cell of claim 1 wherein said electrochromic material is capable of passing from a nontransparent state to a transparent or semitransparent state, depending upon the state of charge of said material, and further wherein said electrochromic material is selected from the group comprising transition metal oxides. heteropolyacids, metal-oxide cermets, mixed oxide composites, hydrous Group VIII metal oxides, organic electrochromic materials, and redox compounds.

14. The electrochromic cell of claim 1 wherein said electrochromic material is capable of existing in a transparent or semitransparent state and a nontransparent state, depending upon the state of charge of said material, further wherein said electrochromic material is selected from the group consisting of tungsten oxide ($WO_3$), molybdenum oxide ($MOO_3$), niobium oxide ($Nb_2O_5$), vanadium oxide ($V_2O_5$), titanium oxide ($TiO_2$ or $Ti_2O_5$), copper oxide ($Cu_2O$ or uncolored CuO), bismuth oxide ($Bi_2O_3$), lead oxide (PbO or $PbO_2$), chromium oxide ($Cr_2O_3$), rhodium oxide (RhO, $Rh(OH)_x$, $Rh_2O_3$, or $RhO_2$), cobalt oxide (CoO), manganese oxide (MnO or $Mn(OH)_2$), ruthenium hydroxide ($Ru(OH)_x$), nickel oxide (NiO or $Ni(OH)_2$), osmium hydroxide ($Os(OH)_x$), iridium oxide (IrO, $IrO_2$, or $Ir(OH)_3$), tungsten oxide-vanadium oxide, tungsten oxide-titanium oxide, molybdenum oxide-vanadium oxide, molybdenum oxide-tungsten oxide, nickel oxide-manganese oxide, iridium oxide-tin oxide ($SnO_2$), iridium oxide-indium oxide ($In_2O_3$), phospho-tungstic acid ($H_3PO_4(WO_3) \cdot xH_2O$), ferric ferrocyanide ($Fe_4[Fe(CN)_6]_3$), lithium ferric ferrocyanide ($Li_x,Fe_{4-x}[Fe(CN)_6]_3$), gold tungstate (Au-$WO_3$), platinum tungstate (Pt-$WO_3$), 4,4'-dipyridinium (($C_5H_4N)_2$), diheptylviolgen-dibromide (($C_7H_{15})_2(NC_5H_4)_2Br_2$) (bis-4-ethylpyridine-4'-yl)pyridium) perchlorate, 1,1'-dibenzyl-4,4'-bipyridinium difluorborate, 5,10-dihydro-5,10-dimethylphenazine, methylviologen compounds, pyridine ($C_5H_5N$), 4,4'-diamino-3,3'-dimethylbiphenyl, orthotoluidine ($C_{14}H_{18}N_2$), anthraquinone, 2-tertiary butylanthraquinone ($C_{14}H_7O_2C(CH_3)_3$), phenothiazines, methylene blue ($C_{16}H_{18}ClN_3S$), tetra thiafulvalene ($C_6H_4S_4$), pyrazoline ($C_3H_6N_2$), polythiophene (($C_4H_4S)_x$) polyaniline (($C_6HSNH_2)_x$), polytriphenylamine (($C_6H_5)_3N])_x$, lutetium diphthalocyanine (($C_{32}H_{16}N_8)_2Lu$), and tris(5,5'-dicarbo(3-acrylatoprop-1-oxy)-2,2'bipyridine) ruthenium(II).

15. The electrochromic cell of claim 1 wherein one of said transparent electrical conductors is selected from the group consisting of tin oxide ($SnO2$), tin oxide doped with antimony and fluorine ($SnO_2$:F,Sb), indium oxide ($In_2O_3$), indium oxide and tin ($In_2O_3Sn$) (5–15% Sn), zinc oxide (ZnO), zinc oxide and indium (ZnO:In), zinc oxide and aluminum (ZnO:Al), cadmium stannate ($Cd_2SnO_4$), cadmium stannite ($CdSnO_3$), cadmium oxide (CdO), copper sulfide ($Cu_2S$), titanium nitride (TIN), titanium oxynitride ($TiO_xN_{1-x}$), copper, silver, gold, aluminum, nickel, stainless steel, chromium, titanium, rhodium, and brass.

16. The electrochromic cell of claim 1 wherein at least one of said transparent electrical conductors is in contact with a substrate selected from the group comprising glass or plastic substrates.

17. An electrochromic device comprising:

a) a solid layer of material capable of existing in a transparent electrical charge state, said layer further comprising:
   i) an electrochromic material;
   ii) an organosulfur material further comprising a compound having the general formula, in its charged state, of $(R(S)_y)_2$ wherein y is 2 to 4, and R is one or more of the same or different aliphatic or aromatic organic moieties having 1 to 100 carbon atoms which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic chain may be linear, branched, saturated or unsaturated, and wherein either the aliphatic chain or the aromatic ring may have substituted groups thereon; and
   iii) a polymer electrolyte material;
b) a first transparent electrically conductive film in electrical contact with a first surface of said layer of material;
c) a second transparent electrically conductive film in electrical contact with a second surface of said layer of material electrochromic reservoir; anti
d) a first substrate in contact with one of said transparent electrically conductive films.

18. The electrochromic device of claim 1 wherein said polymer electrolyte material further comprises a material selected from the group consisting of polyethylene oxide, oxymethylene-linked polyethylene oxide, amorphous polyethylene oxide, linked polyethylene glycols, polypropylene oxide, polyvinyl alcohol, polyethylene glycol, polypropylene glycol, and poly[bis(-(methoxyethoxy)ethoxy)] phosphazene.

19. The electrochromic device of claim 17 wherein said polymer electrolyte material further comprises polyethylene oxide.

20. The electrochromic device of claim 17 which further includes sealing means for sealing end edges of said device.

21. The electrochromic device of claim 17, wherein said organosulfur material is further characterized by a sulfur-sulfur bond when said device is in the charged state which, upon discharge of said electrochromic device, is broken to form a mercaptan or an organothiolate with a Group IA ion in said cell, further wherein said Group IA ion is an ion selected from the group consisting of hydrogen, lithium, sodium, potassium, rubidium, and cesium.

22. The electrochromic device of claim 17 which further comprises a second substrate in contact with the other of said transparent electrically conductive films.

23. The electrochromic device of claim 22 which further comprises electrical contact members electrically connected to said first and said second transparent electrically conductive films, respectively.

24. The electrochromic device of claim 17 wherein said transparent electrically conductive films comprise indium oxide and tin.

25. An electrochromic device having one level of transparency when in a charged state and a second level of transparency when in a discharged state comprising:
a) a first transparent electrically conductive planar film including an electrical contact member;
b) a solid layer of material capable of existing in a transparent electrical charge state having a first surface in electrical contact with said first transparent electrically conductive film, said layer of material further comprising:
  i) an electrochromic material comprising one or more materials selected from the group consisting of transition metal oxides, heteropolyacids, metal-oxide cermets, mixed oxide composites, hydrous Group VIII metal oxides, organic electrochromic materials, and redox compounds;
  ii) an organosulfur material further comprising a compound having the general formula, in its charged state, of $(R(S)_y)_2$ wherein y is 2 to 4, and R is one or more of the same or different aliphatic or aromatic organic moieties having 1 to 100 carbon atoms which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic chain may be linear, branched, saturated or unsaturated, and wherein either the aliphatic chain or the aromatic ring may have substituted groups thereon; and
  iii) a polymer electrolyte material;
c) a second transparent electrically conductive planar film having a first surface in contact with a second surface of said layer of material;
d) planar substrates in contact with said transparent electrically conductive films, said substrates selected from the group comprising plastic or glass substrates; and
e) sealing means for sealing end edges of said planar members of said electrochromic device.

26. The electrochromic device of claim 25 wherein said layer of material is semitransparent, in both the charged and discharged states.

27. The electrochromic device of claim 25 wherein said layer of material is transparent, in both the charged and discharged states, to electromagnetic radiation of at least a narrow band.

28. The electrochromic device of claim 25 wherein said electrically conductive film is selected from the group consisting of tin oxide $SnO_2$), tin oxide doped with antimony and fluorine ($SnO_2$:F, Sb), indium oxide ($In_2O_3$), indium oxide and tin ($In_2O_3$:Sn) (5–15% Sn), zinc oxide (ZnO), zinc oxide and indium (ZnO:In), zinc oxide and aluminum (ZnO:Al), cadmium stannate ($Cd_2SnO_4$), cadmium stannite ($CdSnO_3$), cadmium oxide (CdO), copper sulfide ($Cu_2S$), titanium nitride (TiN), titanium oxynitride ($TiO_xN_{1-x}$), copper, silver, gold, aluminum, nickel, stainless steel, chromium, titanium, rhodium, and brass.

29. The electrochromic device of claim 25 wherein said polymer electrolyte material further comprises a material selected from the group consisting of polyethylene oxide, oxymethylene-linked polyethylene oxide, morphous polyethylene; oxide, linked polyethylene glycols, polypropylene oxide, polyvinyl alcohol, polyethylene glycol, polypropylene glycol, and poly[bis(-(methoxyethoxy)ethoxy)] phosphazene.

30. The electrochromic device of claim 25 wherein said polymer electrolyte material comprises polyethylene oxide.

31. The electrochromic device of claim 25 wherein said organosulfur material is further characterized by a sulfur-sulfur bond when said device in a charged state; which, upon discharge of said electrochromic device, is broken to form a mercaptan or an organothiolate with a Group IA ion in said cell, further wherein said Group IA ion is selected from the group consisting of hydrogen, lithium, sodium, potassium, rubidium, and cesium.

32. A method for reversibly coloring an electrochromic device, comprising the steps of:
a) reversibly generating and transporting ions across a layer of material, wherein said layer of material further comprises:
  i) an electrochromic material;
  ii) a polymer electrolyte material further comprising a material selected from the group consisting of polyethylene oxide, oxymethylene-linked polyethylene oxide, amorphous polyethylene oxide, linked polyethylene glycols, polypropylene oxide, polyvinyl alcohol, polyethylene glycol, polypropylene glycol, and poly[bis((methoxyethoxy)ethoxy)] phosphazene; and
  iii) an organosulfur material further comprising a compound having the general formula, in its charged state, of $(R(S)_y)_2$ wherein y is 1 to 6, and R is one or more of the same or different aliphatic or aromatic organic moieties having 1 to 100 carbon atoms which may include one or more oxygen, sulfur, or nitrogen heteroatoms when R comprises one or more aromatic rings, or one or more oxygen, sulfur, nitrogen or fluorine atoms associated with the chain when R comprises an aliphatic chain, wherein the aliphatic chain may be linear, branched, saturated or unsaturated, and wherein either the aliphatic chain or the aromatic ring may have substituted groups thereon;
b) transporting electrons at a first transparent electrically conductive film, wherein said first conductive film is in electrical contact with a first surface of said layer of material; and
c) transporting electrons at a second transparent electrically conductive film, wherein said second conductive film is in electrical contact with a second surface of said layer of material.

33. The method for reversibly coloring an electrochromic device of claim 32, further comprising the steps of:
a) exchanging electrons between said first electrically conductive film and said layer of material; and
b) exchanging electrons between said second electrically conductive film and said layer of material.

34. The method for reversibly coloring an electrochromic device of claim 32 wherein said organosulfur material is further characterized by a sulfur-sulfur bond in the charged state which, upon discharge of said electrochromic device, is broken to form a mercaptan or an organothiolate with a Group IA ion in said cell, further wherein said Group IA ion is selected from the group consisting of hydrogen, lithium, sodium, potassium, rubidium, and cesium.

35. The method for reversibly coloring an electrochromic device of claim 32, wherein said organosulfur material comprises a compound having the general formula, in the charged state, of $(R(S)_y)_2$ has a value of y from 2 to 4.

36. The method for reversibly coloring an electrochromic device of claim 32 wherein said layer of material is semitransparent, in both the charged and discharged states.

37. The method for reversibly coloring an electrochromic device of claim 32 wherein said layer of material is transparent, in both the charged and discharged states, to electromagnetic radiation of at least a narrow band.

38. The method for reversibly coloring an electrochromic device of claim 32, wherein said electrochromic material is capable of passing from a nontransparent state to a transparent or semitransparent state depending upon the state of charge of said material, further in which said electrochromic material is selected from the group consisting of transition metal oxides, heteropolyacids, metal-oxide cermets, mixed oxide composites, hydrous Group VIII metal oxides, organic electrochromic materials, and redox compounds.

39. The method for reversibly coloring an electrochromic device of claim 33 wherein said layer of material further comprises an electrolyte selected from the group consisting of hydrogen, lithium, sodium, potassium, rubidium and cesium.

40. The method for reversibly coloring an electrochromic device of claim 32 wherein one of said transparent electrically conductive films is selected from the group consisting of tin oxide ($SnO2$), tin oxide doped with antimony and fluorine ($SnO_2$:F,Sb), indium oxide ($In_2O_3$), indium oxide and tin ($In_2O_3$:Sn) (5–15% Sn), zinc oxide (ZnO), zinc oxide and indium (ZnO:In), zinc oxide and aluminum (ZnO:Al), cadmium stannate ($Cd_2SnO_4$), cadmium stannite ($CdSnO_3$), cadmium oxide (CdO), copper sulfide ($Cu_2S$), titanium nitride (TIN), titanium oxynitride ($TiO_xN_{1-x}$), copper, silver, gold, aluminum., nickel, stainless steel, chromium, titanium, rhodium, and brass.

41. The method for reversibly coloring an electrochromic device of claim 32 wherein at least one of said transparent electrically conductive films is in contact with a substrate selected from the group consisting of glass and plastic substrates.

42. The method for reversibly coloring an electrochromic device of claim 32 which further comprises the steps of charging and discharging said electrically conductive films by a potential source, wherein said potential source is in electrical communication with said electrically conductive films.

43. The method for reversibly coloring an electrochromic device of claim 32 wherein said polymer electrolyte material comprises polyethylene oxide.

* * * * *